(12) United States Patent
Chen et al.

(10) Patent No.: US 11,126,734 B2
(45) Date of Patent: Sep. 21, 2021

(54) METHOD, DEVICE AND COMPUTER PROGRAM PRODUCT FOR DATA PROCESSING

(71) Applicant: EMC IP Holding Company LLC, Hopkinton, MA (US)

(72) Inventors: Fei Chen, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 132 days.

(21) Appl. No.: 16/388,578

(22) Filed: Apr. 18, 2019

(65) Prior Publication Data

US 2019/0325148 A1 Oct. 24, 2019

(30) Foreign Application Priority Data

Apr. 20, 2018 (CN) .......................... 201810361390.3

(51) Int. Cl.

| | |
|---|---|
| *G06F 21/60* | (2013.01) |
| *G06F 16/182* | (2019.01) |
| *G06Q 20/38* | (2012.01) |
| *H04L 12/24* | (2006.01) |

(52) U.S. Cl.
CPC ........ *G06F 21/602* (2013.01); *G06F 16/1824* (2019.01); *G06F 16/1834* (2019.01); *G06Q 20/382* (2013.01); *H04L 41/0806* (2013.01)

(58) Field of Classification Search
CPC ....... G06F 21/60–608; G06F 2211/007; G06F 2211/008; G06F 2221/2107; G06F 16/1824; G06F 16/1834; H04L 9/06–0668; H04L 9/30–3093; H04L 41/0806; G06Q 20/382
See application file for complete search history.

(56) References Cited

U.S. PATENT DOCUMENTS

| | | | | |
|---|---|---|---|---|
| 7,177,310 | B2 * | 2/2007 | Inagaki | H04L 12/4625 370/392 |
| 9,619,167 | B2 * | 4/2017 | Khan | G06F 3/0659 |
| 9,767,053 | B2 * | 9/2017 | Woo | G06F 13/1673 |
| 10,142,156 | B2 * | 11/2018 | Lippert | H04L 29/08081 |
| 2010/0322076 | A1 * | 12/2010 | Goel | H04L 45/745 370/236 |
| 2017/0270056 | A1 * | 9/2017 | Chung | G06F 12/1009 |
| 2017/0359332 | A1 * | 12/2017 | Hanay | H04L 63/068 |
| 2018/0006806 | A1 * | 1/2018 | Wang | G09C 1/00 |
| 2020/0184489 | A1 * | 6/2020 | Negi | G06F 16/258 |

* cited by examiner

*Primary Examiner* — Madhuri R Herzog
(74) *Attorney, Agent, or Firm* — Ryan, Mason & Lewis, LLP

(57) ABSTRACT

A data processing method comprises: in response to data to be encrypted or decrypted, determining, at a blockchain node, whether an adapter coupled to the node has been initialized; in response to determining that the adapter has not been initialized, determining an access address of the adapter; initializing the adapter based on the access address; and enabling the initialized adapter to encrypt or decrypt the data. As such, data encryption or decryption at the blockchain node is accelerated via the adapter.

20 Claims, 4 Drawing Sheets

METHOD, DEVICE AND COMPUTER PROGRAM PRODUCT FOR DATA PROCESSING

RELATED APPLICATION(S)

The present application claims priority to Chinese Patent Application No. 201810361390.3, filed Apr. 20, 2018, and entitled "Method, Device and Computer Program Product for Data Processing," which is incorporated by reference herein in its entirety.

FIELD

Embodiments of the present disclosure relate to the field of data processing, and more specifically, to method, device and computer program product for data processing.

BACKGROUND

A QuickAssist Technology (QAT) adapter is currently known for enhancing security and compression performance of dynamic data and static data in cloud, network, big data and storage applications. The QAT adapter boosts performance of a single application (such as security encryption or financial computing) while reducing power consumption. The QAT adapter approach supports an Intel Architecture (IA) architecture-based multicore processor accelerator and a third-party accelerator cooperating with the IA-based server and develops a newly integrated accelerator inside the IA-based processor. The QAT adapter also comprises a software layer, also known as Application Program Blockchain is a new type of application mode for computer technologies, such as distributed data storage, peer-to-peer transmission, consensus mechanisms, encryption algorithms and the like. The so-called consensus mechanism is a mathematical algorithm for establishing trust and accessing rights among different nodes in the blockchain system. A large amount of data encryption and decryption processing is usually involved among each node of the blockchain to satisfy the security requirement. For example, Hyperledger is a solution for blockchain and more than half of the data processing of each node of the blockchain is related to encryption and decryption. The data encryption and decryption processing occupy a large amount of resources of a central processor unit (CPU), which severely affects data processing performance of the node. Moreover, the API of the QAT adapter does not currently support nodes of a blockchain, especially a Hyperledger network. In other words, the nodes of a blockchain, especially a Hyperledger network, cannot use the API of the QAT adapter to access the QAT adapter. Therefore, the nodes of a Hyperledger network currently cannot employ the QAT adapter to accelerate the data encryption and decryption processing.

SUMMARY

Embodiments of the present disclosure provide a solution for data processing.

In a first aspect of the present disclosure, a data processing method is provided. The method comprises: in response to data to be encrypted or decrypted, determining, at a blockchain node, whether an adapter coupled to the node has been initialized; in response to determining that the adapter has not been initialized, determining an access address of the adapter; initializing the adapter based on the access address; and enabling the initialized adapter to encrypt or decrypt the data.

In a second aspect of the present disclosure, a device for data processing is provided. The device comprises: a processor; and a memory coupled to the processor and having instructions stored therein, the instructions, when executed by a processor, causing the device to execute actions. The actions comprise: in response to data to be encrypted or decrypted, determining, at a blockchain node, whether an adapter coupled to the node has been initialized; in response to determining that the adapter has not been initialized, determining an access address of the adapter; initializing the adapter based on the access address; and enabling the initialized adapter to encrypt or decrypt the data.

In a third aspect of the present disclosure, a computer program product is provided. The computer program product is tangibly stored on a computer-readable medium and comprises machine-executable instructions, the machine-executable instructions, when executed, causing a machine to perform the method according to the first aspect.

In a fourth aspect of the present disclosure, a computer-readable medium stored with computer-readable instructions thereon is provided, the computer-readable instructions when executed, causing a device to execute the method according to the first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION

Figure 1:
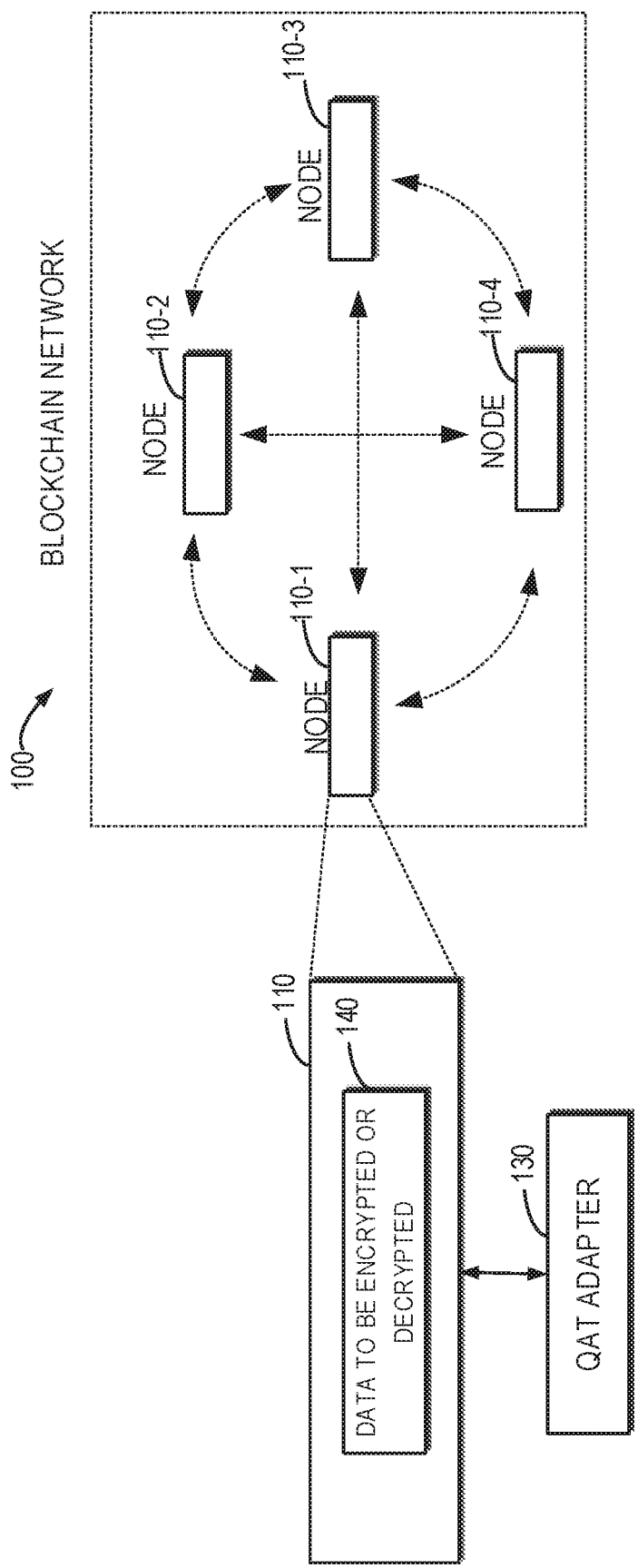
FIG. 1 illustrates a schematic diagram of an environment where embodiments of the present disclosure can be implemented.

The principle of the present disclosure will be described with reference to the several example embodiments shown in the drawings. Although the drawings illustrate preferred embodiments of the present disclosure, it should be understood that the embodiments are described merely to enable those skilled in the art to better understand and further implement the present disclosure and are not intended to limit the scope of the present disclosure in any manner.

As used herein, the term "comprises" and its variants are to be read as open-ended terms that mean "comprises, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can comprise other explicit and implicit definitions.

As used herein, the term "file" comprises electronic files of various formats containing all kinds of contents, such as electronic document, image file, video file, audio file or any other formats of files.

FIG. 1 illustrates a schematic diagram of an environment 100 in which embodiments of the present disclosure can be implemented. The environment 100 comprises a blockchain node network and the node network comprises several blockchain nodes 110-1, 110-2, 110-3 and 110-4, which are collectively known as nodes 110 or individually as node 110 as the context below will dictate. The nodes 110 herein may refer to any one of a client node, a committing node, an ordering service node, a certificate authority node, or a combination thereof. Trust is established and rights are accessed among the nodes 110 via transactions. Upon receipt of data from the transactions and upon transmission of the transaction data to other nodes, the node 110 will decrypt the data. Further, even without data transmission and reception, each node 110 per se also encrypts and decrypts the data based on the needs of the algorithm.

At least one QuickAssist Technology (QAT) adapter 130 (one example of what is more generally referred to herein as an "adapter") is coupled to the node 110 to increase efficiency of data encryption and decryption processing. The QAT adapter may be coupled to the node 110 via any suitable manners, e.g., physical plug, network connection, and the like. According to embodiments of the present disclosure, the node 110 may access the QAT adapter 130 in any suitable ways. The access to the QAT adapter 130 by the node 110 may comprise acquiring an address of the QAT adapter, initializing the QAT adapter 130, and transmitting data to the QAT adapter for processing etc.

The QAT adapter 130 can encrypt or decrypt the data in a suitable way. For example, upon receipt of data 140 to be encrypted or decrypted, the QAT adapter 130 is configured to automatically encrypt or decrypt the data according to the data type and reception or transmission situation. Alternatively, the QAT adapter 130, when receiving data to be encrypted or decrypted, also can wait for a further instruction from the node 110 and then correspondingly process the data. Thus, the encryption or decryption of data at the blockchain node 110 can be accelerated via the QAT adapter 130, so as to significantly alleviate the pressure of data processing on the node 110, particularly on its central processor unit (CPU), thereby reducing energy consumption.

The above environment 100 will be explained below in detail by using a Hyperledger network as an example. The environment is indicated as environment 100' in FIG. 2. The Hyperledger network 100' comprises a plurality of nodes 110-1', 110-2', 110-3' and 110-4', which are collectively known as nodes 110' or individually as node 110' as the context below will dictate. The node 110' is a type of blockchain node 110 for implementing the function of the Hyperledger network 100'. The node 110' can access one or more QAT adapters via an Application Program Interface (API) 120 of the QAT adapter(s) by means of a context table 150 and the thread pool 160. Note that three QAT adapters 130-1, 130-2 and 130-3 are illustratively shown, which are collectively known as QAT adapter 130 below. The API 120 of the QAT adapter 130 may be a set of functions having one or more functionalities provided by the adapter provider for accessing the QAT adapter 130. For example, the node 110' can acquire the address of the QAT adapter 130 by invoking an address retrieval function in the API 120, and may also initialize the QAT adapter 130 by invoking an initialization function in the API 120.

The node 110' may adapt to the API 120 of the QAT adapter 130 in a suitable way. Because the QAT adapter 130 currently supports the C language-based function to implement invocation of the API 120, the API 120 of the QAT adapter 130 may be invoked by embedding the C language function in each node 110'. The above embodiments where invocation of the API 120 of the QAT adapter 130 is implemented in each node 110' are merely for illustration, without suggesting any limitations as to the scope of the present disclosure. Any suitable alternative approaches can be used.

A procedure for data processing in the node 110' may be implemented via a thread running in the node 110'. The thread may be selected from the thread pool 160. For example, in response to an indication that data 140 is to be encrypted or decrypted, one thread may be selected from the thread pool 160 to access the above data 140. The use of the thread pool 160 may enhance efficiency of the data processing and efficiency of each QAT adapter 130.

Figure 2:
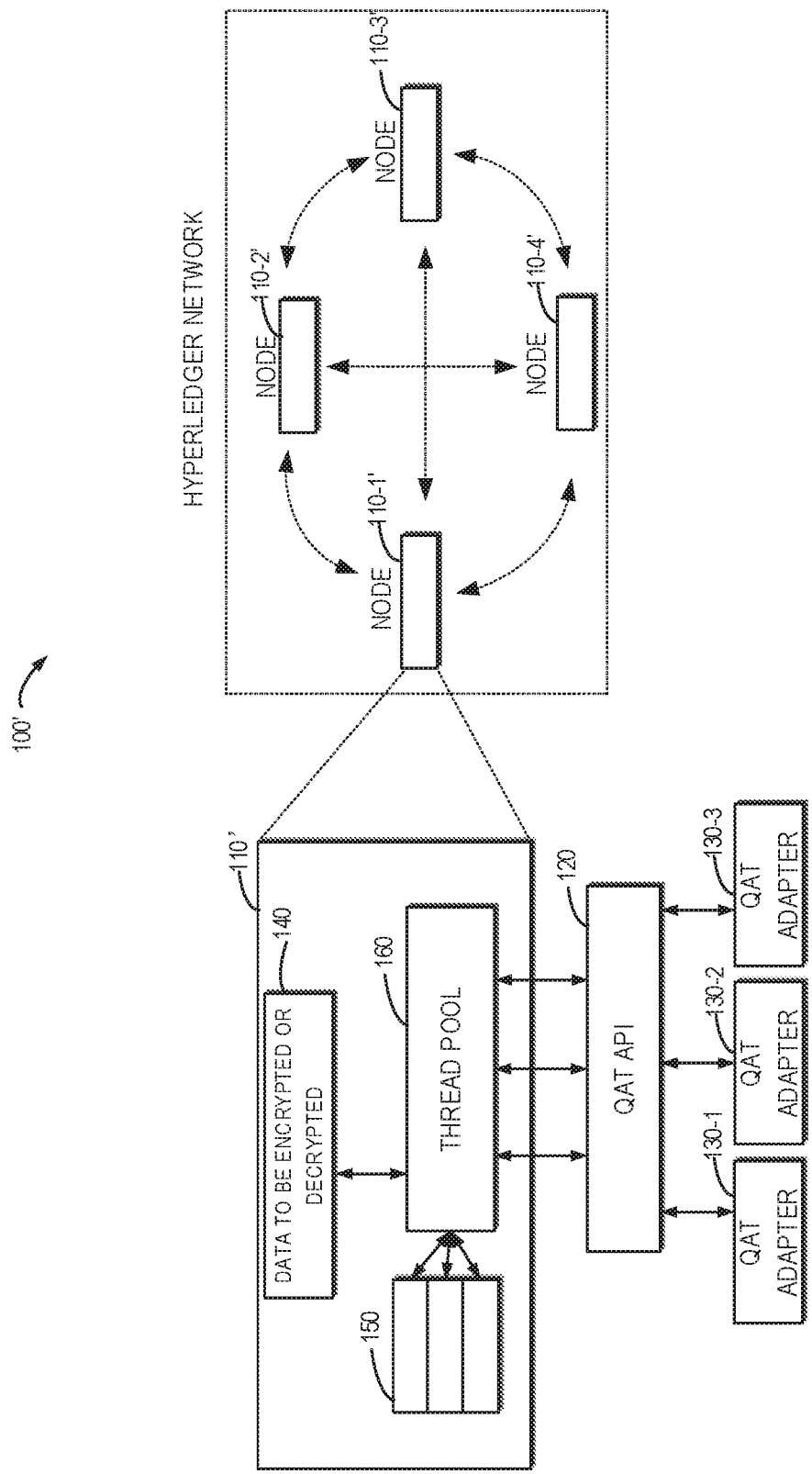
FIG. 2 illustrates a schematic diagram of an environment where some embodiments of the present disclosure are implemented.

Specifically, recall as shown in the example environment of FIG. 2, the node 110' is coupled to three QAT adapters 130-1, 130-2 and 130-3, which are collectively known as QAT adapter 130. It should be appreciated that the three QAT adapters as shown are merely for illustration, without suggesting any limitations as to the scope of the present disclosure. Any other appropriate number of QAT adapters can be coupled to the node 110'.

One QAT adapter 130 may be associated with one or more threads. That is, the data 140 to be processed via one or more threads may be transmitted to one QAT adapter 130 for processing, which is particularly favorable for the case where there is a larger amount of data 140 to be processed and each data 140 is relatively small. This is because it costs a certain time to transmit/receive data 140 to/from the QAT adapter 130. Although the time is quite short, the processing efficiency will be affected when there is a larger amount of data 140 to be processed. Therefore, a plurality of threads, by being associated with the QAT adapter 130, each may successively transmit the associated data 140 to the QAT adapter 130 before the previous thread receives the return data 140, so as to improve efficiency of the data processing.

Of course, it should be understood that the above embodiments of implementing data processing through the thread pool 160 technology are merely for illustration, without suggesting any limitations as to the scope of the present disclosure. Any other suitable technologies in the art may be employed. For example, in some embodiments, data processing may also be implemented using a single thread or other multi-thread technologies.

The node 110' also may optimize the encryption or decryption of the data 140 via the QAT adapter 130 by introducing a context table 150. For example, the context table 150 may store an operation state of the QAT adapter 130, wherein the operation state may at least comprise whether the QAT adapter 130 has been initialized. By introducing the context table 150, the QAT adapter 130 only needs to be initialized once and it is unnecessary to initialize the initialization device every time before processing the data 140. This further improves efficiency of the data processing. The context table 150 may also be used to store the acquired access address of the QAT adapter 130. For example, the context table 150 may have a plurality of rows and each row may store the access address of the associated QAT adapter 130 and state information of the QAT adapter 130. For example, a corresponding position is marked as "1" in the context table 150 to represent that the associated QAT adapter 130 has been initialized and the position is marked as "0" to represent that the adapter has not been initialized.

Apart from the above states of being initialized or not, the operation state in the context table 150 associated with the QAT adapter 130 may also comprise, but is not limited to, a number of threads associated with the QAT adapter 130 and the like, which will be further explained below. Of course, it should be understood that the above embodiments about the context table 150 are merely for illustration, without suggesting any limitations as to the scope of the present disclosure. It is possible that the context table 150 takes any other suitable forms and stores any other suitable contents. For example, the context table 150 may also store the number and busy level of threads in the thread pool 160.

It can be understood from the above that by processing the encrypted or decrypted data of the blockchain node 110, especially of the Hyperledger network node 110', using the QAT adapter 130, data processing pressure on the node can be reduced and the efficiency of processing the data can be improved. Moreover, energy consumption of the node is therefore greatly reduced.

Figure 3:
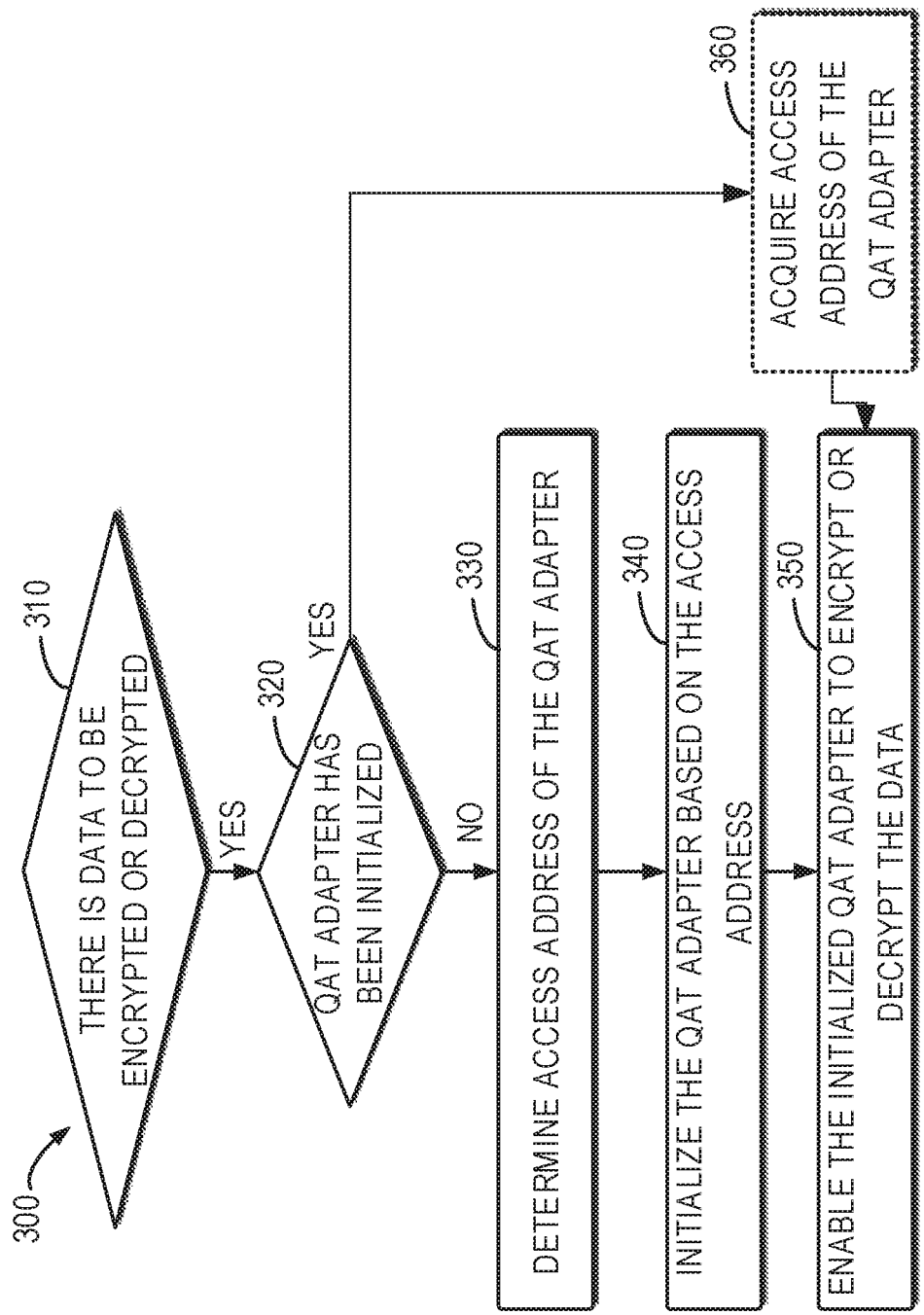
FIG. 3 illustrates a flowchart of a procedure for data processing according to one embodiment of the present disclosure.

Further embodiments of the present disclosure will be described below in detail with reference to the drawings. FIG. 3 illustrates a flowchart of a procedure 300 of indexing files according to embodiments of the present disclosure. The procedure 300 may be implemented by the node 110, e.g., by a control module of the node 110. In other embodiments, the procedure 300 also may be implemented by a computing device independent of the node 110. For ease of discussion, the procedure 300 is discussed with reference to FIGS. 1 and 2 and the explanation is made by using the procedure 300 implemented by node 110 as an example.

At 310, the node 110 will determine, based on the requirement of algorithm or rules, whether the data 140 should be encrypted or decrypted. For example, the node 110, when receiving a group of data, will determine that the data 140 should be encrypted or decrypted. At 320, in response to there being data 140 to be encrypted or decrypted, it is determined whether the QAT adapter 130 coupled to the node 110 has been initialized. As mentioned above, the node 110, when receiving the data 140, transmitting the data 140, and voluntarily processing the data 140, encrypts or decrypts the data 140.

Encryption or decryption of the data 140 may comprise the operations of signing, verifying and encrypting or decrypting the data 140 using any other suitable algorithms, for example, but not limited to, using asymmetric cryptographic algorithm (RSA) and the like. In some embodiments, the procedure may be implemented by using the above described thread pool 160. The QAT adapter 130 is determined to be initialized or not by the context table 150 associated with the QAT adapter 130, which will be explained in detail below.

If it is determined that the QAT adapter 130 has not been initialized, an access address of the QAT adapter 130 is determined at 330. In the case where one node 110 is coupled to a plurality of QAT adapters 130, if none of the plurality of QAT adapters 130 are initialized, the node 110 may choose any one of the QAT adapters 130 to execute the above procedure. In some embodiments, if at least one of the plurality of QAT adapters 130 has been initialized and the at least one QAT adapter 130 might be in a busy state of processing other data, the node 110 may also select any one of the other adapters apart from the above at least one QAT adapter 130 to execute the above procedure.

After the access address of the QAT device is confirmed, the node 110 will initialize the QAT adapter 130 by invoking an initialization function of the API 120 based on the access address at 340. For example, the corresponding QAT adapter 130 may be initialized by making the access address be a parameter of the initialization function. After the QAT adapter 130 is initialized through the above procedure, at 350, the initialized QAT adapter 130 is enabled to encrypt or decrypt the above data 140.

Through the above procedure, the encryption or decryption related to the data 140 at the node 110 is achieved by the QAT adapter 130, which significantly reduces the pressure of the processing of data 140 on the CPU coupled to the node 110 and improves the efficiency of the processing of data 140 accordingly. For example, without the use of QAT adapter 130, the signing performance when using the RSA algorithm is about 810 times per second and the verifying performance is about 28267 times per second. When the QAT adapter 130 is used to encrypt or decrypt the data 140 at the node 110, the signing performance when using the RSA algorithm is about 41974 times per second and the verifying performance is about 196993 times per second. It can be seen that the capability of the processing of data 140 is enhanced significantly.

In some embodiments, the QAT adapter 130 is determined to be initialized or not by acquiring an operation state of the QAT adapter 130 from the context table 150 associated with the QAT adapter 130. The node 110 may acquire the access address of the adapter 130 by invoking the API when the QAT adapter 130 is just coupled to the node 110, and record the access address in the context table 150 and mark the position in the context table 150 corresponding to the operation state of the QAT adapter as "0," which indicates that the QAT adapter has not been initialized yet.

In some embodiments, the node 110 may also establish a corresponding context table 150 when accessing the QAT adapter. In those embodiments, if the operation state of the QAT adapter 130 acquired by querying the context table 150 is NULL, then the QAT adapter 130 can be accessed by invoking the API 120 of the QAT adapter 130 in the aforementioned suitable manners. For example, in some embodiments, the access address of the QAT adapter 130 may also be acquired by invoking the address retrieval function in the API 120. The acquired access address may be stored in a row in the context table 150 corresponding to the QAT adapter 130.

Of course, it should be understood that the access address also can be stored at any suitable positions that can be acquired in the context table 150. Because the initialization of the QAT device calls for acquiring the access address of the QAT adapter 130 in the first place, the fact that the QAT adapter 130 has been initialized also means that the access address of the QAT adapter 130 has been stored in the context table 150 associated with the QAT adapter 130.

In this case, if it is determined that the QAT adapter 130 has been initialized via the context table 150, at 360 as shown in FIG. 3, the node 110 may directly acquire the access address of the QAT adapter 130 from the context table 150 associated with the QAT adapter 130 and enable the QAT adapter 130 to encrypt or decrypt the data 140 based on the access address. In other words, after the QAT adapter has been initialized, the subsequent processing of the data using the QAT adapter does not need re-initialization, which further improves the efficiency of data processing.

As mentioned above, apart from the above states that the QAT adapter has been initialized or not, an operation state of the QAT adapter 130 in the context table 150 may also comprise, but is not limited to, a number or the like of threads associated with the QAT adapter 130. In some embodiments, the context table 150 may also store a number of threads associated with the QAT adapter 130 to represent a busy level of the QAT adapter 130. For example, in the case where the node 110 is coupled to a plurality of QAT adapters 130 and the QAT adapters 130 have all been initialized, the node 110 may choose, by querying the context table 150, a QAT adapter 130 with a smaller number of associated threads to perform data processing.

Of course, it should be appreciated that embodiments of the operation state of the QAT device stored in the context table 150 are merely for illustration, without suggesting any limitations as to the scope of the present disclosure. The context table 150 may also store any suitable operation states related to the QAT device or the thread pool 160. For example, in some embodiments, the context table 150 may also store a busy level of threads in the thread pool 160 etc.

In some embodiments, after acquiring the access address of the uninitialized QAT adapter 130, the QAT adapter 130 may be initialized via the API 120. For example, the QAT adapter 130 is initialized by setting the access address as a parameter of the initialization function in the API 120. Next, the operation state of the QAT adapter 130 is updated in the context table 150 associated with the QAT adapter 130. For example, a position corresponding to a row in the context table 150 associated with the access address of the QAT adapter 130 is updated from "0" to "1", to indicate that the QAT adapter 130 has been initialized.

Figure 4:
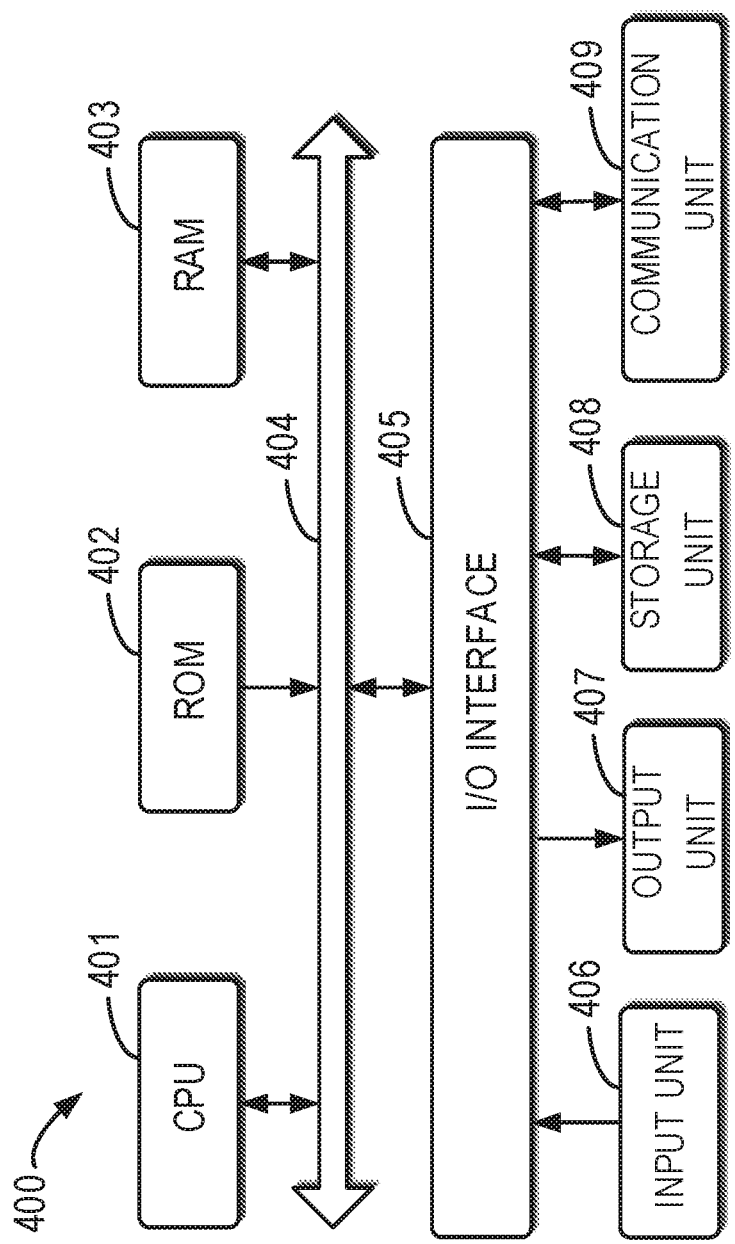
FIG. 4 illustrates a block diagram of an example device for implementing embodiments of the present disclosure.

FIG. 4 illustrates a schematic block diagram of an example device 400 for implementing embodiments of the present disclosure. The device 400 can implement the procedure 300 of FIG. 3. The device 400 may be a device independent of a file system 120 or may be integrated in the file system 120. As shown, the device 400 comprises a central process unit (CPU) 401, which can execute various suitable actions and processing based on the computer program instructions stored in the read-only memory (ROM) 402 or computer program instructions loaded in the random-access memory (RAM) 403 from a storage unit 408. The RAM 403 can also store all kinds of programs and data required by the operations of the device 400. CPU 401, ROM 402 and RAM 403 are connected to each other via a bus 404. The input/output (I/O) interface 405 is also connected to the bus 404.

A plurality of components in the device 400 are connected to the I/O interface 405, including: an input unit 406, such as keyboard, mouse and the like; an output unit 407, e.g., various kinds of displays and loudspeakers etc.; a storage unit 408, such as disk, optical disk etc.; and a communication unit 409, such as network card, modem, wireless transceiver and the like. The communication unit 409 allows the device 400 to exchange information/data with other devices via the computer network, such as Internet, and/or various telecommunication networks.

The processing unit 401 executes each method and process described above, such as the procedure 300. For example, in some embodiments, the procedure 300 may be implemented as computer software programs or computer program products tangibly included in the machine-readable medium, such as a non-transient computer-readable medium, e.g., storage unit 408. In some embodiments, the computer program may be partially or fully loaded and/or mounted to the device 400 via ROM 402 and/or communication unit 409. When the computer program is loaded to RAM 403 and executed by the CPU 401, one or more steps of the above described procedure 300 can be executed. Alternatively, in other embodiments, the CPU 401 may be configured, via other suitable manners (e.g., by means of firmware), to execute one or more steps of the procedure 300.

The present disclosure relates to method, device, computer program product and computer-readable storage medium etc. The computer-readable storage medium is stored with computer-readable program instructions for executing various aspects of the present disclosure.

The computer-readable storage medium may be a tangible device that maintains and stores instructions utilized by the instruction executing devices. The computer-readable storage medium can be, but is not limited to, such as electrical storage device, magnetic storage device, optical storage device, electromagnetic storage device, semiconductor storage device or any appropriate combinations of the above. More concrete examples of the computer-readable storage medium (non-exhaustive list) comprise: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted to include transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction herein may be downloaded from the computer-readable storage medium to each computing/processing device, or to an external computer or external storage via Internet, local area network, wide area network and/or wireless network. The network may comprise copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, micro codes, firmware instructions, state setting data, or source codes or target codes written in any combinations of one or more programming languages, wherein the programming languages consist of object-oriented programming languages, such as Smalltalk, C++ and the like, and traditional procedural programming languages, e.g., C language or similar programming languages. The computer-readable program instructions may be implemented fully on the user computer, partially on the user computer, as an independent software package, partially on the user computer and partially on the remote computer, or completely on the remote computer or server. In the case where a remote computer is involved, the remote computer can be connected to the user computer via any type of networks including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Each aspect of the present disclosure is disclosed herein with reference to the flow chart and/or block diagram of a method, a device (system) and a computer program product according to embodiments of the present disclosure. It should be understood that each block of the flow chart and/or block diagram and combinations of each block in the flow chart and/or block diagram may be implemented by the computer-readable program instructions.

The computer-readable program instructions may be provided to the processing unit of general-purpose computer, dedicated computer or other programmable data processing devices to manufacture a machine, such that the instructions, when executed by the processing unit of the computer or other programmable data processing devices, generate a device for implementing functions/actions stipulated in one or more blocks in the flow chart and/or block diagram. The computer-readable program instructions may also be stored in the computer-readable storage medium and cause the computer, programmable data processing device and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions may also be loaded onto computer, other programmable data processing devices or other devices, so as to execute a series of operation steps on the computer, other programmable data processing devices or other devices to generate a computer-implemented procedure. Therefore, the instructions executed on the computer, other programmable data processing devices or other devices implement functions/actions stipulated in one or more blocks of the flow chart and/or block diagram.

The flow chart and block diagram in the drawings illustrate system architecture, functions and operations that may be implemented by device, method and computer program product according to multiple implementations of the present disclosure. In this regard, each block in the flow chart or block diagram can represent a module, a part of program segment or code, wherein the module and the part of program segment or code comprise one or more executable instructions for performing stipulated logic functions. In some alternative implementations, it should be noted that the functions indicated in the block may also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart may be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments disclosed herein. Many modifications and alterations, without deviating from the scope and spirit of the explained various embodiments, are obvious for those skilled in the art. The selection of terms in the text aims to best explain principles and actual applications of each embodiment and technical improvements made to the technology in the market by each embodiment, or enable other ordinary skilled in the art to understand embodiments of the present disclosure.

What is claimed is:

1. A method of data processing, comprising:
in response to data to be encrypted or decrypted, determining, at a blockchain node operatively connected to a plurality of blockchain nodes of a blockchain network, whether an adapter coupled to the blockchain node has been initialized to perform a cryptographic operation, the adapter being initialized when the adapter is in a predetermined operation state;
in response to determining that the adapter has not been initialized, determining, by the blockchain node, an access address of the adapter;
initializing, by the blockchain node, the adapter by invoking an initialization function based on the access address; and
enabling, by the blockchain node, the initialized adapter to encrypt or decrypt the data.

2. The method of claim 1, wherein determining whether the adapter coupled to the blockchain node has been initialized comprises:
acquiring an operation state of the adapter from a context table associated with the adapter; and
determining, based on the operation state, whether the adapter has been initialized.

3. The method of claim 1, wherein determining the access address of the adapter comprises:
determining the access address by accessing an application programming interface of the adapter; and
recording the access address in a context table associated with the adapter.

4. The method of claim 1, wherein initializing the adapter comprises:
setting the access address as a parameter of the initialization function in an application programming interface;
initializing the adapter via an application programming interface of the adapter based on the access address; and
updating an operation state of the adapter in a context table associated with the adapter, the updated operation state indicating that the adapter has been initialized.

5. The method of claim 1, further comprising:
transmitting the data to the access address of the adapter.

6. The method of claim 1, further comprising:
in response to determining that the adapter has been initialized, acquiring an access address of the adapter from a context table associated with the adapter; and
enabling the initialized adapter to encrypt or decrypt the data based on the access address.

7. A device for data processing, comprising:
a processor; and
a memory coupled to the processor and having instructions stored therein, the instructions, when executed by the processor, causing the device to execute actions comprising:

in response to data to be encrypted or decrypted, determining, at a blockchain node operatively connected to a plurality of blockchain nodes of a blockchain network, whether an adapter coupled to the blockchain node has been initialized to perform a cryptographic operation, the adapter being initialized when the adapter is in a predetermined operation state;

in response to determining that the adapter has not been initialized, determining, by the blockchain node, an access address of the adapter;

initializing, by the blockchain node, the adapter by invoking an initialization function based on the access address; and enabling, by the blockchain node, the initialized adapter to encrypt or decrypt the data.

8. The device of claim 7, wherein determining whether the adapter coupled to the blockchain node has been initialized comprises:

acquiring an operation state of the adapter from a context table associated with the adapter; and determining, based on the operation state, whether the adapter has been initialized.

9. The device of claim 7, wherein determining the access address of the adapter comprises:

determining the access address by accessing an application programming interface of the adapter; and recording the access address in a context table associated with the adapter.

10. The device of claim 7, wherein initializing the adapter comprises:

setting the access address as a parameter of the initialization function in an application programming interface;

initializing the adapter via an application programming interface of the adapter based on the access address; and updating an operation state of the adapter in a context table associated with the adapter, the updated operation state indicating that the adapter has been initialized.

11. The device of claim 7, wherein the actions further comprise:

transmitting the data to the access address of the adapter.

12. The device of claim 7, wherein the actions further comprise:

in response to determining that the adapter has been initialized, acquiring an access address of the adapter from a context table associated with the adapter; and enabling the initialized adapter to encrypt or decrypt the data based on the access address.

13. A computer program product tangibly stored on a computer-readable storage medium and having machine-executable instructions, the machine-executable instructions, when executed, causing a machine to execute a method comprising steps of:

in response to data to be encrypted or decrypted, determining, at a blockchain node operatively connected to a plurality of blockchain nodes of a blockchain network, whether an adapter coupled to the blockchain node has been initialized to perform a cryptographic operation, the adapter being initialized when the adapter is in a predetermined operation state;

in response to determining that the adapter has not been initialized, determining, by the blockchain node, an access address of the adapter;

initializing, by the blockchain node, the adapter by invoking an initialization function based on the access address; and enabling, by the blockchain node, the initialized adapter to encrypt or decrypt the data.

14. The computer program product of claim 13, wherein determining whether the adapter coupled to the blockchain node has been initialized comprises:

acquiring an operation state of the adapter from a context table associated with the adapter; and determining, based on the operation state, whether the adapter has been initialized.

15. The computer program product of claim 13, wherein determining the access address of the adapter comprises:

determining the access address by accessing an application programming interface of the adapter; and recording the access address in a context table associated with the adapter.

16. The computer program product of claim 13, wherein initializing the adapter comprises:

setting the access address as a parameter of the initialization function;

initializing the adapter via an application programming interface of the adapter based on the access address; and updating an operation state of the adapter in a context table associated with the adapter, the updated operation state indicating that the adapter has been initialized.

17. The computer program product of claim 13, further comprising:

transmitting the data to the access address of the adapter.

18. The computer program product of claim 13, further comprising:

in response to determining that the adapter has been initialized, acquiring an access address of the adapter from a context table associated with the adapter; and enabling the initialized adapter to encrypt or decrypt the data based on the access address.

19. The computer program product of claim 13, wherein determining, by the blockchain node, an access address of the adapter comprises determining, by the blockchain node, the access address of the adapter via an application programming interface of the adapter.

20. The computer program product of claim 19, wherein initializing, by the blockchain node, the adapter by invoking an initialization function comprises initializing, by the blockchain node, the adapter by invoking an initialization function of the application programming interface based on the access address.

* * * * *